(12) United States Patent
Syed et al.

(10) Patent No.: US 10,175,830 B2
(45) Date of Patent: Jan. 8, 2019

(54) SYSTEMS AND METHODS FOR PRE-CHARGING A DISPLAY PANEL

(71) Applicant: Apple Inc., Cupertino, CA (US)

(72) Inventors: Taif A. Syed, Toronto (CA); Kingsuk Brahma, San Francisco, CA (US); Christoph H. Krah, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 548 days.

(21) Appl. No.: 14/870,815

(22) Filed: Sep. 30, 2015

(65) Prior Publication Data

US 2017/0090612 A1    Mar. 30, 2017

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04101* (2013.01)

(58) Field of Classification Search
CPC ....... G06F 3/044; G06F 3/0416; G06F 3/0412
USPC .................................................. 345/173, 174
See application file for complete search history.

(56) References Cited

U.S. PATENT DOCUMENTS

| 9,151,792 | B1 * | 10/2015 | Kremin | G01R 27/2605 |
| 2015/0177885 | A1 * | 6/2015 | Noto | G06F 3/044 345/174 |
| 2015/0310812 | A1 * | 10/2015 | Chen | G09G 3/3696 345/691 |

* cited by examiner

*Primary Examiner* — Calvin C Ma
(74) *Attorney, Agent, or Firm* — Fletcher Yoder, PC

(57) ABSTRACT

A method for pre-charging a display panel may include simultaneously charging the display panel that displays image data and receives one or more touch inputs via a first voltage source and a capacitor that provides a first voltage to the display panel via a second voltage source. The first voltage is associated with receiving the one or more touch inputs, and the display panel and the capacitor are simultaneously charged for a first amount of time. The method may then include charging the display panel via the capacitor after the first amount of time for a second amount of time and charging the display panel via the second voltage source after the second amount of time for a third amount of time.

32 Claims, 11 Drawing Sheets

SYSTEMS AND METHODS FOR PRE-CHARGING A DISPLAY PANEL

CROSS REFERENCE TO RELATED APPLICATIONS

This application is related to U.S. Patent Application Ser. No. 62/111,077, and is hereby incorporated by reference in its entirety.

BACKGROUND

The present disclosure relates generally to pre-charging a display panel and, more specifically, to pre-charging a display panel for display periods and touch periods.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of electronic devices include display panels to display image data and receive touch inputs from a user, such that the user may interact with the electronic device. Generally, to display image data and receive touch inputs, the display panel may alternate between a display period when the image data is displayed and a touch period when touch inputs are detected. During the display period, the display panel (e.g., capacitance) may be pre-charged to a first voltage that enables the display panel to display the image data. In the same manner, during the touch period, the display panel may be pre-charged to a second voltage that enables the display panel to detect touch inputs. The first and second voltages may be different values. To effectively display image data and receive touch inputs at the same time, the display panel may alternate between the display period and touch period at a rapid rate (e.g., 60 Hz). That is, the display panel may pre-charge to the first voltage for displaying the image data for a first amount of time and pre-charge to the second voltage for receiving touch inputs for a second amount of time, such that two amounts of time occur quickly enough that a user (e.g., human) would not detect the change between the display period and the touch period.

To enhance the ability of the display panel to detect touch inputs, the display panel may switch between the display period and the touch period more frequently. However, various challenges may arise when increasing the frequency in which an electronic device switches between the display period and the touch period.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to pre-charging a display panel (e.g., capacitance) with two voltages, such that the display panel may effectively display image and receive touch inputs. More specifically, the present disclosure relates to pre-charging the display panel to a display voltage via a display voltage source (VCOM_D) and pre-charging the display panel to a touch voltage via multiple stage process that limits the current output to the display panel while making the transition from the display voltage to the touch voltage within a certain amount of time (e.g., 5 µs). In certain embodiments, an electronic device may use a display panel as a display and as an interface to receive touch inputs via touch-sensing circuitry within the display panel. To simultaneously display image data and detect touches, the display panel may frequently alternate between a display period mode (e.g., when a frame of image data is rendered on an active display region of the display panel) and touch period mode (e.g., when the active display region detects touch inputs). The display period and touch period modes for the display panel may be characterized by two different sets of voltages applied to the active display region of the display panel via two voltage sources (e.g., high and low, display voltage source and touch voltage source).

During the display period, the active display region may receive a display voltage (VCOM_D) from the display voltage source such that the active display region may be capable of displaying the image data. During the touch period, the active display region may receive a touch voltage (VCOM_T) from the touch voltage source such that the active display region may be capable of detecting touch inputs. In one embodiment, the touch voltage (VCOM_T) may be provided to the display panel via a bypass capacitor (Cb) that may be coupled to the touch voltage source. The bypass capacitor (Cb) may limit the amount of current provided to the display panel and control the amount of time for the voltage in the display panel to settle to the touch voltage (VCOM_T). When the display panel is operating in the display period mode, the display panel may receive the display voltage (VCOM_D) via the display voltage source. At the same time, the bypass capacitor (Cb) may be charged via the touch voltage source. When transitioning from the display voltage to the touch voltage, a first switch that couples the display voltage source to the display panel and a second switch that couples the touch voltage to the bypass capacitor (Cb) may be opened while a third switch that couples the bypass capacitor (Cb) to the display panel may be closed.

Initially, since the display panel is connected to just the bypass capacitor (Cb), the amount of current output to the display panel may be limited by a resistor in series with the bypass capacitor (Cb). Moreover, the size of the bypass capacitor (Cb) may be selected to limit the amount of current output to the display panel. In addition, by initially charging the display panel via the bypass capacitor (Cb) alone, the pre-charge settle time for the display panel or the time that the voltage received by display panel via the bypass capacitor (Cb) may settle within a certain amount of time. Although the pre-charge settle time for the display panel may be within a desired amount of time, the display panel may not be charged to the touch voltage (VCOM_T) within the same amount of time. As such, after the third switch has been closed for a first amount of time (e.g., 1 µs), the third switch may open while a fourth switch in series with the touch voltage source and the display panel may be closed until the voltage of the display panel is charged to the touch voltage (VCOM_T). After reaching the touch voltage (VCOM_T), the fourth switch may be opened and the first and third switches may be closed again, such that the display panel may receive the display voltage (VCOM_D) from the display voltage source and the bypass capacitor (Cb) may be charged via the touch voltage source. This process may be continuously repeated, thereby enabling the display panel to simultaneously display image data and detect touch inputs.

By charging the display panel to the touch voltage (VCOM_T) using the bypass capacitor (Cb) and the touch voltage source during two different stages, the display panel may effectively switch between the display voltage (VCOM_D) to the touch voltage (VCOM_T) while limiting an amount of current provided to the display panel and decreasing the amount of time for the touch voltage to settle in the display panel. As a result, the display panel may alternate between the display period and the touch period more frequently (e.g., 120 Hz), thereby improving the ability of the display panel to detect touches and display better quality image data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for pre-charging a display panel of an electronic device. More specifically, the present disclosure is related to systems and methods for charging a display panel (e.g., capacitance) between a display voltage (VCOM_D) and a touch voltage (VCOM_T) using two stages to limit the current output to the display panel and the amount of time for the display panel voltage to settle to the touch voltage (VCOM_T). Additional details with regard to how the display panel is charged from the display voltage (VCOM_D) to the touch voltage (VCOM_T) via the two stages will be discussed below with reference to FIGS. 1-9.

Figure 1:
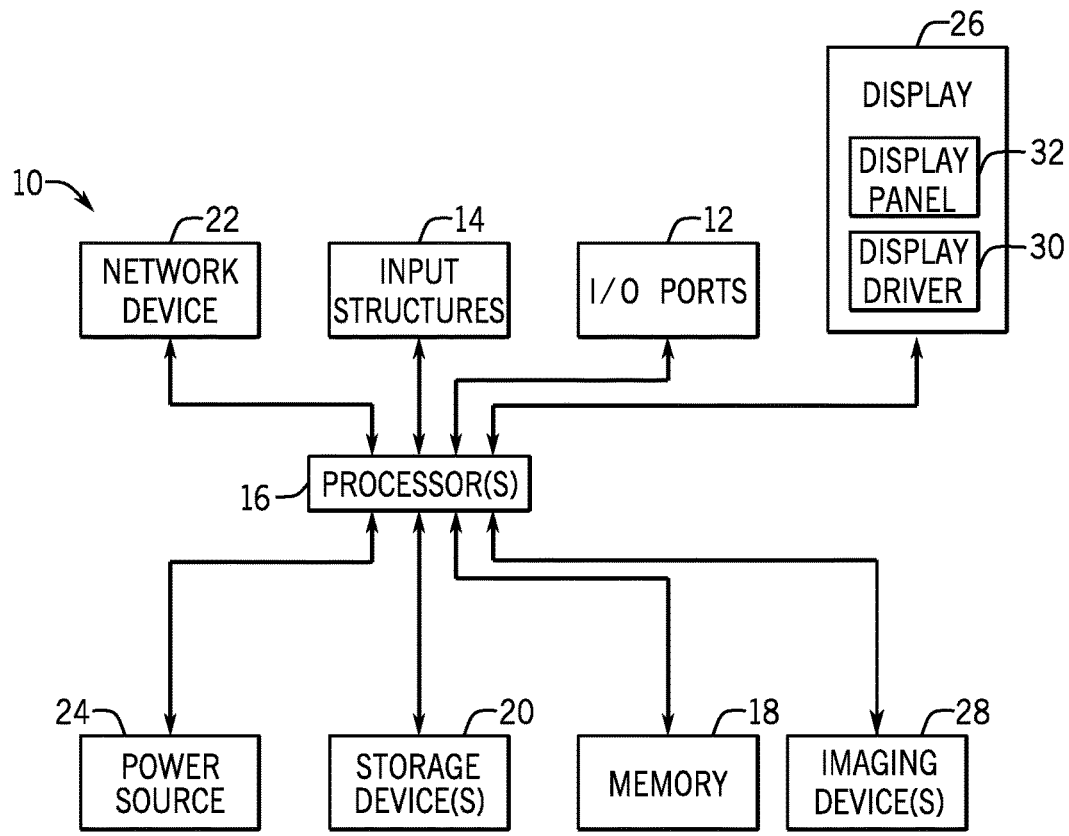
FIG. 1 is a simplified block diagram of components of an electronic device that may depict image data on a display, in accordance with embodiments described herein.

By way of introduction, FIG. 1 is a block diagram illustrating an example of an electronic device 10 that may include the gate driver and column driver circuitry mentioned above. The electronic device 10 may be any suitable electronic device, such as a laptop or desktop computer, a mobile phone, a digital media player, television, or the like. By way of example, the electronic device 10 may be a portable electronic device, such as a model of an iPod® or iPhone®, available from Apple Inc. of Cupertino, Calif. The electronic device 10 may be a desktop or notebook computer, such as a model of a MacBook®, MacBook® Pro, MacBook Air®, iMac®, Mac® Mini, or Mac Pro®, available from Apple Inc. In other embodiments, electronic device 10 may be a model of an electronic device from another manufacturer.

As shown in FIG. 1, the electronic device 10 may include various components. The functional blocks shown in FIG. 1 may represent hardware elements (including circuitry), software elements (including code stored on a computer-readable medium) or a combination of both hardware and software elements. In the example of FIG. 1, the electronic device 10 includes input/output (I/O) ports 12, input structures 14, one or more processors 16, a memory 18, nonvolatile storage 20, networking device 22, power source 24, display 26, and one or more imaging devices 28. It should be appreciated, however, that the components illustrated in FIG. 1 are provided only as an example. Other embodiments of the electronic device 10 may include more or fewer components. To provide one example, some embodiments of the electronic device 10 may not include the imaging device(s) 28.

Before continuing further, it should be noted that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Considering each of the components of FIG. 1, the I/O ports 12 may represent ports to connect to a variety of devices, such as a power source, an audio output device, or other electronic devices. The input structures 14 may enable user input to the electronic device, and may include hardware keys, a touch-sensitive element of the display 26, and/or a microphone.

The processor(s) 16 may control the general operation of the device 10. For instance, the processor(s) 16 may execute an operating system, programs, user and application interfaces, and other functions of the electronic device 10. The processor(s) 16 may include one or more microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As may be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, Preview®, iMovie®, or Final Cut Pro® available from Apple Inc., or the "Camera" and/or "Photo" applications provided by Apple Inc. and available on some models of the iPhone®, iPod®, and iPad®.

A computer-readable medium, such as the memory 18 or the nonvolatile storage 20, may store the instructions or data to be processed by the processor(s) 16. The memory 18 may include any suitable memory device, such as random access memory (RAM) or read only memory (ROM). The nonvolatile storage 20 may include flash memory, a hard drive, or any other optical, magnetic, and/or solid-state storage media. The memory 18 and/or the nonvolatile storage 20 may store firmware, data files, image data, software programs and applications, and so forth.

The network device 22 may be a network controller or a network interface card (NIC), and may enable network communication over a local area network (LAN) (e.g., Wi-Fi), a personal area network (e.g., Bluetooth), and/or a wide area network (WAN) (e.g., a 3G or 4G data network). The power source 24 of the device 10 may include a Li-ion battery and/or a power supply unit (PSU) to draw power from an electrical outlet or an alternating-current (AC) power supply.

The display 26 may display various images generated by device 10, such as a GUI for an operating system or image data (including still images and video data). The display 26 may be any suitable type of display, such as a liquid crystal display (LCD), plasma display, or an organic light emitting diode (OLED) display, for example. Additionally, as mentioned above, the display 26 may include a touch-sensitive element that may represent an input structure 14 of the electronic device 10. The imaging device(s) 28 of the electronic device 10 may represent a digital camera that may acquire both still images and video. Each imaging device 28 may include a lens and an image sensor capture and convert light into electrical signals.

In certain embodiments, the display 26 may include a display driver integrated circuit (IC) 30 and a display panel 32. The display driver IC 30 may be separate or integral to the display 26. The display driver IC 30 may include circuit components to provide the display panel 32 with voltages to enable the display panel 32 to depict image data and receive touch inputs.

Figure 2:
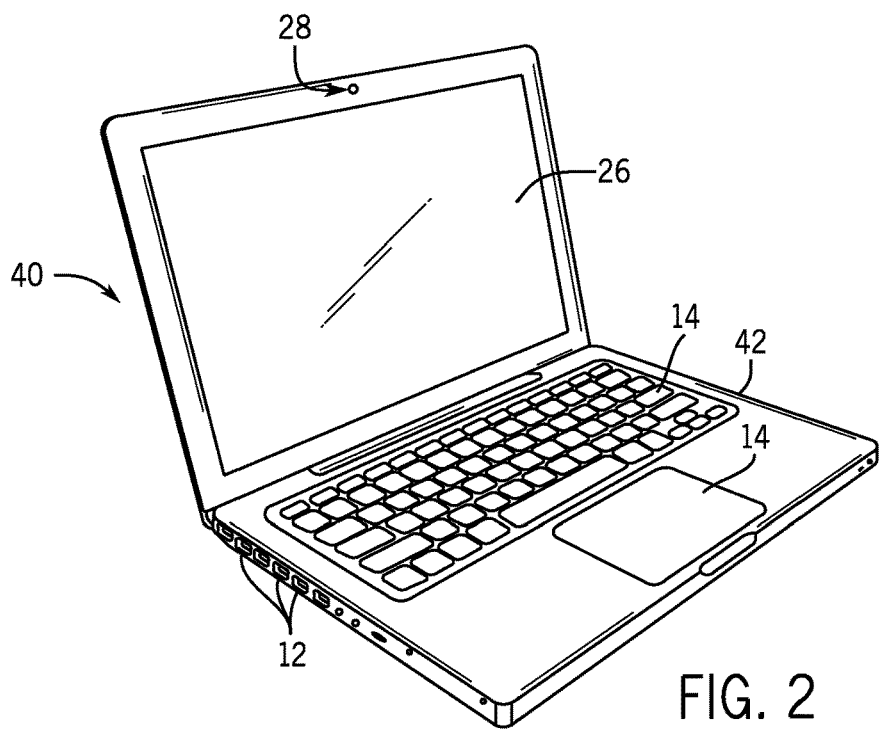
FIG. 2 is a perspective view of the electronic device of FIG. 1 in the form of a notebook computing device, in accordance with embodiments described herein.

With the foregoing in mind, the electronic device 10 may take any number of suitable forms. Some examples of these possible forms appear in FIGS. 2-5. Turning to FIG. 2, a notebook computer 40 may include a housing 42, the display 26, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 24), memory (e.g., memory 18), and storage capabilities (e.g., storage device 20), as described above with respect to FIG. 1.

The notebook computer 40 may include an integrated imaging device 28 (e.g., a camera). In other embodiments, the notebook computer 40 may use an external camera (e.g., an external USB camera or a "webcam") connected to one or more of the I/O ports 12 instead of or in addition to the integrated imaging device 28. In certain embodiments, the depicted notebook computer 40 may be a model of a MacBook®, MacBook® Pro, MacBook Air®, or PowerBook® available from Apple Inc. In other embodiments, the computer 40 may be portable tablet computing device, such as a model of an iPad® from Apple Inc.

Figure 3:
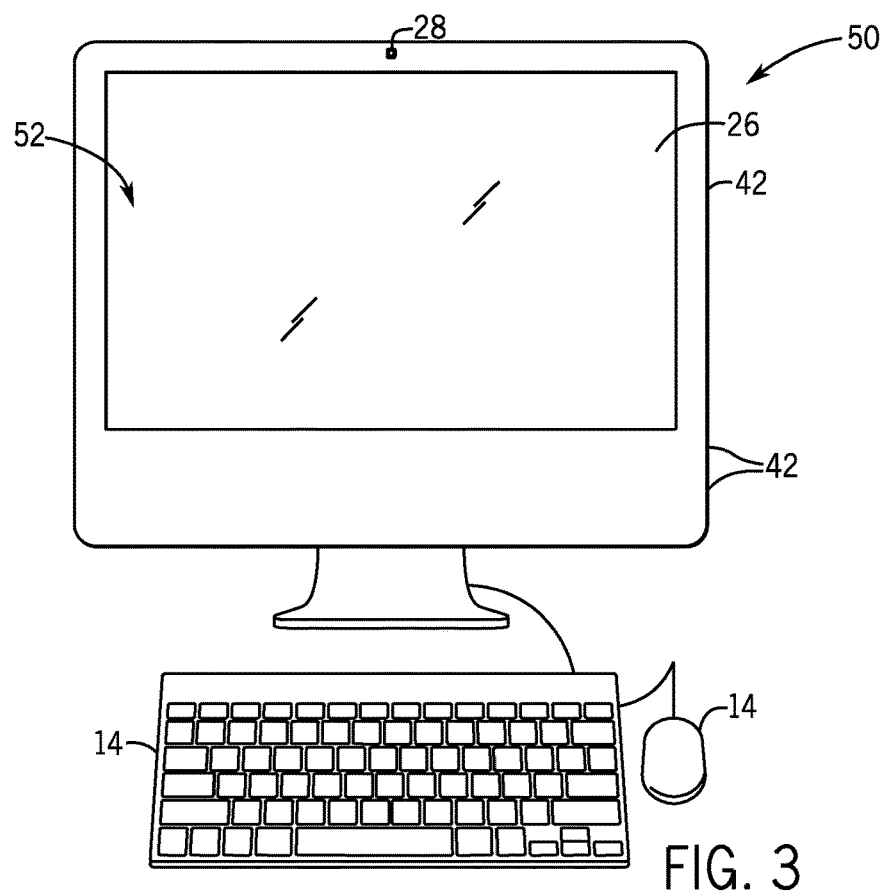
FIG. 3 is a front view of the electronic device of FIG. 1 in the form of a desktop computing device, in accordance with embodiments described herein.

FIG. 3 shows the electronic device 10 in the form of a desktop computer 50. The desktop computer 50 may include a number of features that may be generally similar to those provided by the notebook computer 40 shown in FIG. 4, but may have a generally larger overall form factor. As shown, the desktop computer 50 may be housed in an enclosure 42 that includes the display 26, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 28, which may be an integrated or external camera, as discussed above. In certain embodiments, the depicted desktop computer 50 may be a model of an iMac®, Mac® mini, or Mac Pro®, available from Apple Inc.

Figure 5:
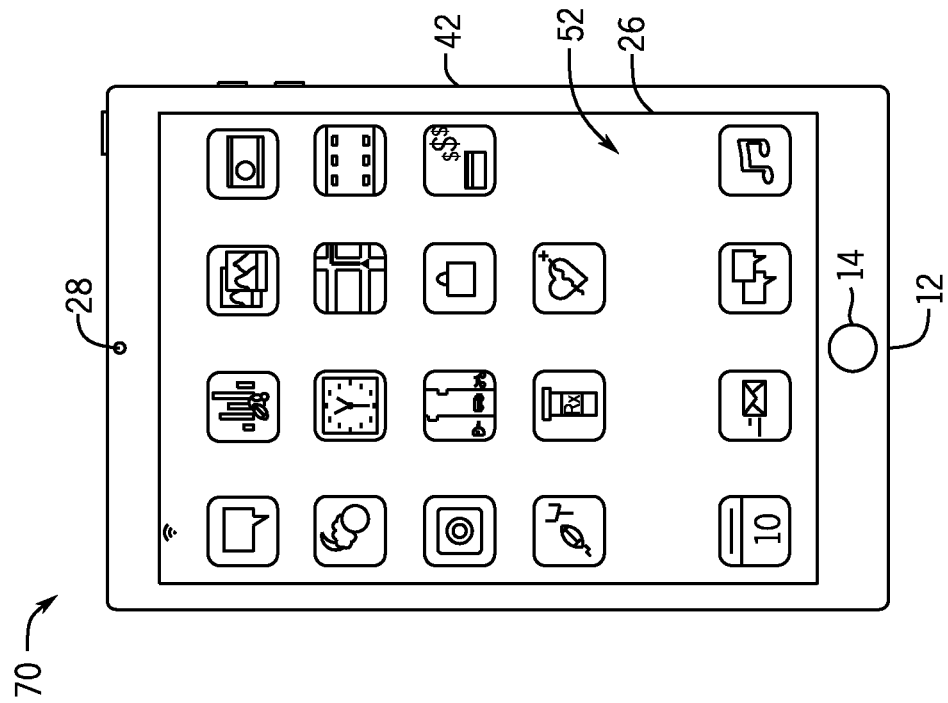
FIG. 5 is a front view of the electronic device of FIG. 1 in the form of a tablet computing device, in accordance with embodiments described herein.
Figure 4:
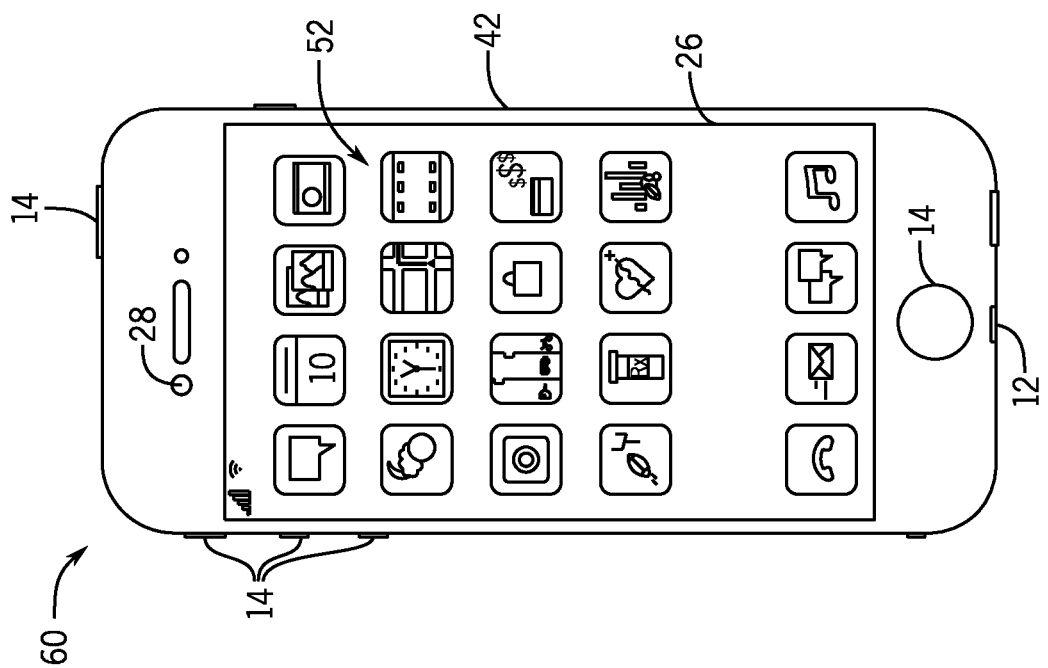
FIG. 4 is a front view of the electronic device of FIG. 1 in the form of a handheld portable electronic device, in accordance with embodiments described herein.

The electronic device 10 may also take the form of portable handheld device 60 or 70, as shown in FIGS. 4 and 5. By way of example, the handheld device 60 or 70 may be a model of an iPod® or iPhone® available from Apple Inc. The handheld device 60 or 70 includes an enclosure 42, which may function to protect the interior components from physical damage and to shield them from electromagnetic interference. The enclosure 42 also includes various user input structures 14 through which a user may interface with the handheld device 60 or 70. Each input structure 14 may control various device functions when pressed or actuated. As shown in FIGS. 4 and 5, the handheld device 60 or 70 may also include various I/O ports 12. For instance, the depicted I/O ports 12 may include a proprietary connection port for transmitting and receiving data files or for charging a power source 24. Further, the I/O ports 12 may also be used to output voltage, current, and power to other connected devices.

The display 26 may display images generated by the handheld device 60 or 70. For example, the display 26 may display system indicators that may indicate device power status, signal strength, external device connections, and so forth. The display 26 may also display a GUI 52 that allows a user to interact with the device 60 or 70, as discussed above with reference to FIG. 3. The GUI 52 may include graphical elements, such as the icons, which may correspond to various applications that may be opened or executed upon detecting a user selection of a respective icon.

Figure 6:
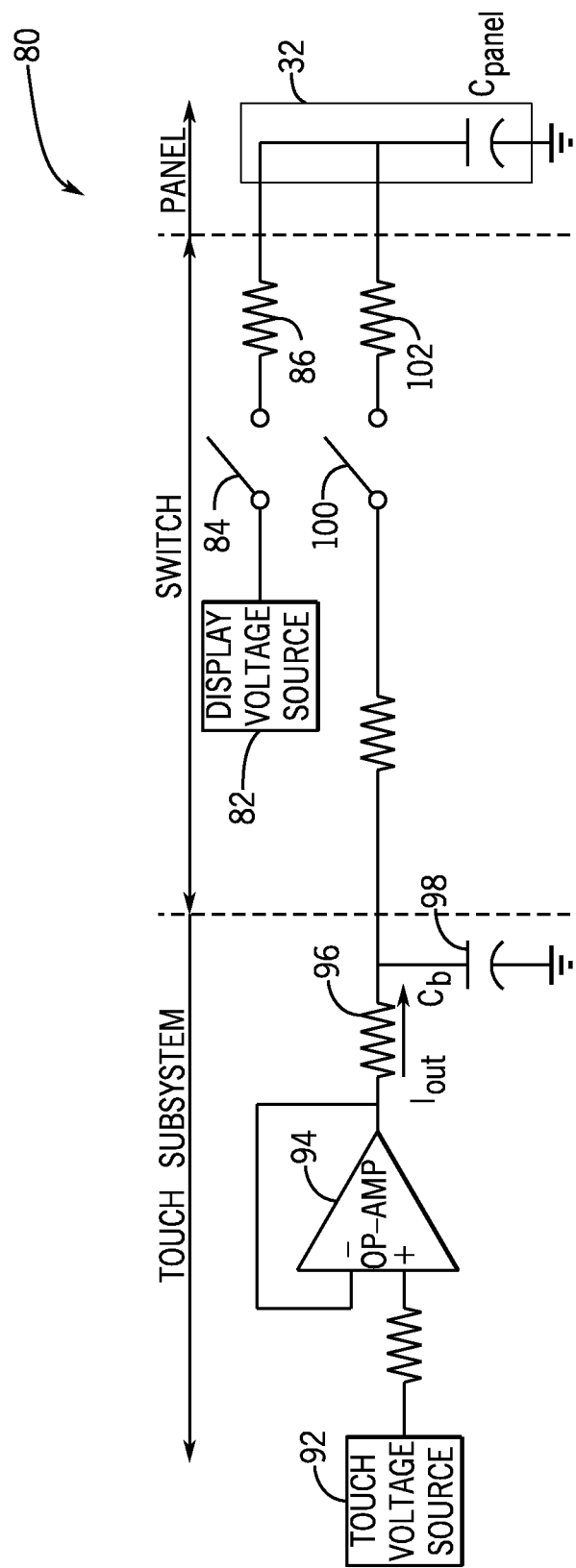
FIG. 6 is an example circuit diagram of a display driver integrated circuit (IC) in the display of the electronic device of FIG. 1, in accordance with an embodiment.

With the foregoing in mind, FIG. 6 illustrates an example circuit 80 that may be part of the display driver 30 described above. The circuit 80 may be employed to provide a display voltage (VCOM_D) (e.g., −2.5 V) and a touch voltage (VCOM_T) (e.g., 2.5 V) to the display panel 32 (capacitance $C_{panel}$). In one embodiment, the display voltage (VCOM_D) may be provided to the display panel 32 via a display voltage source 82, a switch 84, and a resistor 86. That is, the switch 84 may be closed and the display voltage source 82 may provide a voltage to the resistor 86 via the switch 84, such that the display panel 32 may receive the display voltage (VCOM_D). It should be noted that the switch 84 and other switches mentioned herein may include any type of device that connects two nodes of an electrical circuit together. As such, the switch 84 may include a transistor, a metal-oxide-semiconductor field-effect transistor (MOSFET), and the like.

In addition to the display voltage source 82, the circuit 80 may include a touch voltage source 92, which may provide a voltage to an operational amplifier (op-amp) 94. In one embodiment, the op-amp 94 may be a unity op-amp that may output the same voltage provided to it. The voltage output by the op-amp 94 may be provided to a resistor 96, which may be coupled to a bypass capacitor ($C_b$) 98. Since the touch voltage source 92 is coupled to the bypass capacitor 98 via the op-amp 94 and the resistor 96, the bypass capacitor 98 may remain charged to a touch voltage (VCOM_T) via the touch voltage source 92.

In one embodiment, when the display panel 32 switches from a display period to a touch period, the switch 84 may open and a switch 100 coupled between the bypass capacitor 98 and the display panel 32 may close. As such, the touch voltage (VCOM_T) may be provided to the display panel 32 via the bypass capacitor 98, the switch 100, and a resistor 102. In certain embodiments, the resistor 96 and the bypass capacitor 98 may be sized such that the current output via the op-amp 94 may be limited to some value (e.g., 50 mA) to meet the current specifications of the display panel 32. Additionally, the resistor 96 and the bypass capacitor 98 may be sized such that a settling time ($t_{settle}$) or a time in which the display panel 32 may receive the touch voltage (VCOM_T) and settle to within a certain range (e.g., 50 mV) of the touch voltage (VCOM_T) value may be within some amount of time (e.g., 5 μs).

In order to limit the output current ($I_{out}$) and settling time ($t_{settle}$) to certain values, the sizes of the resistor 96 and the bypass capacitor 98 within the circuit 80 may become relatively large with respect to the electronic device 10 where space is a limited commodity. Moreover, it may prove to be challenging to identify a certain combination of a capacitance of the bypass capacitor 98 and the resistance of the resistor 96. That is, as the capacitance of the bypass capacitor 98 decreases, the resulting output current ($I_{out}$) increases and the settling time ($t_{settle}$) decreases. In the same manner, as the resistance of the resistor 96 decreases, the resulting output current ($I_{out}$) increases and the settling time ($t_{settle}$) decreases. As such, there is a direct contention between the output current ($I_{out}$) and the settling time ($t_{settle}$) based on the sizes of the resistor 96 and the bypass capacitor 98.

Figure 7:
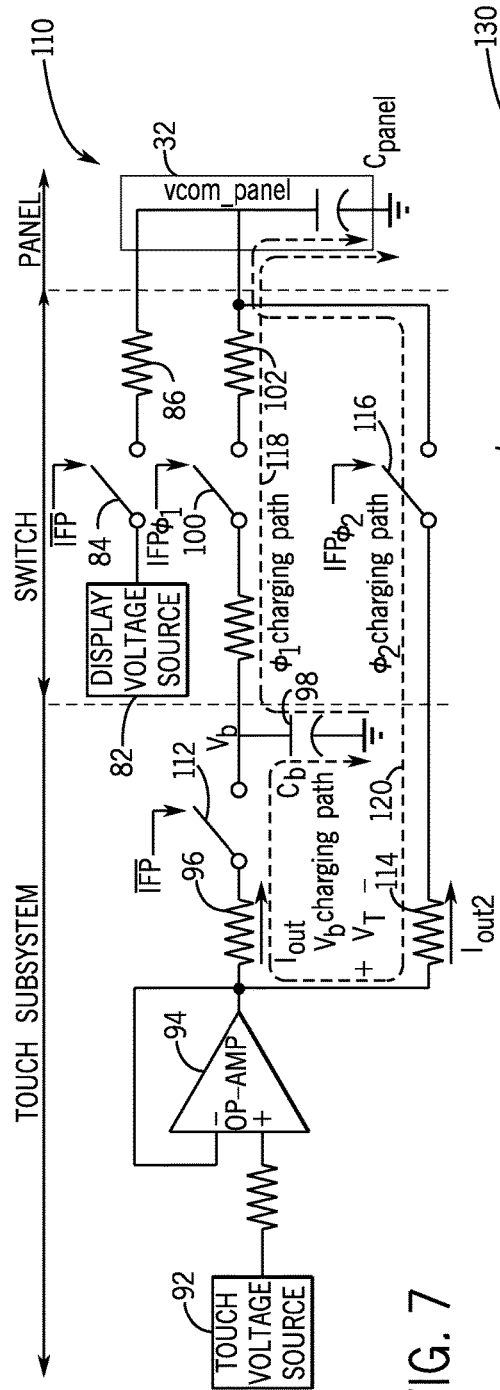
FIG. 7 is another example circuit diagram of a display driver integrated circuit (IC) in the display of FIG. 5, in accordance with an embodiment.

With this in mind, FIG. 7 illustrates a circuit 110 that may be employed within the display driver IC 30 and used to provide the display voltage (VCOM_D) and the touch voltage (VCOM_T) while limiting the output current ($I_{out}$) and settling time ($t_{settle}$) and minimizing the sizes of the bypass capacitor 98 and the resistor 96. Referring now to FIG. 7, the circuit 110 may include similar components as described above with reference to the circuit 80 of FIG. 6. For instance, the circuit 110 may include the display voltage source 82, the switch 84 and the resistor 86 coupled in series with each other to provide the display voltage (VDCOM_D) to the display panel 32.

Like the circuit 80, the circuit 110 may also include the touch voltage source 92, the op-amp 94, the resistor 96 and the bypass capacitor 98. However, unlike the circuit 80, the circuit 110 may include a switch 112 coupled between the resistor 96 and the bypass capacitor 98. In addition to the switch 112, the circuit 110 may include a resistor 114 and a switch 116 coupled between the display panel 32 and the output of the op-amp 94. In this way, the display panel 32 may be charged to the touch voltage (VCOM_T) via two distinct charging paths 118 and 120. That is, if the switch 100 is closed while the switch 116 is open, the display panel 32 may receive the touch voltage (VCOM_T) via the bypass capacitor 98 and charging path 118. However, if the switch 100 is open and the switch 116 is closed, the display panel 32 may receive the touch voltage (VCOM_T) directly from the output of the op-amp 94 via charging path 120.

In one embodiment, the display driver IC 30 may include logic or a processor that may control the operation of each of the switches depicted in the circuit 110. Keeping this in mind, the display driver IC 30 may close the switches 84 and 112 while keeping the switches 100 and 116 open during the display period. As such, the display panel 32 may receive the display voltage (VCOM_D) similar as performed by the circuit 80.

When transitioning from the display period to the touch period, the display driver IC 30 may close the switch 100 and simultaneously open the switch 84 and the switch 96. At this time, the display panel 32 may begin charging to the touch voltage (VCOM_T) via the stored energy of the bypass capacitor 98. After a certain amount of time passes (e.g., 1 µs), the display panel 32 may be within a certain range (e.g., 50 mV) of the touch voltage (VCOM_T). At this time, the display driver IC 30 may open the switch 100 and close the 116 to enable the display panel 32 to completely charge to the touch voltage (VCOM_T). Since the voltage at the display panel 32 is within a certain range of the touch voltage (VCOM_T) when the switch 116 closes, the voltage difference between the output of the op-amp and the voltage of the display panel is smaller as compared to before the switch 100 was closed and the display panel was charged at the display voltage (VCOM_D). As a result, the output current ($I_{out2}$) through the resistor 114 may be significantly lower as compared to if the switch 116 was closed when the display panel was charged to the display voltage (VCOM_D) instead of the switch 100.

For example, assuming that the display panel 32 charges to −2.5 V during the display period and +2.5 V during the touch period, if the switch 116 is closed instead of the switch 100 and the resistance of the of the resistor 114 is 10Ω, the output current (Iout2) across the charging path 120 would be as follows:

$$\Delta V/R = (-2.5V - 2.5V)/10\Omega = -5V/10\Omega = 500 \text{ mA} \tag{1}$$

However, if the switch 100 closes before the switch 116 as described above, and the voltage of the display panel 32 settles to within 50 mV of the touch voltage (2.5V) before the switch 100 opens again, when the switch 116 closes, the output current (Iout2) across the charging path 120, as calculated above, would be as follows:

$$\Delta V/R = (2.45V - 2.5V)/10\Omega = -0.05V/10\Omega = 5 \text{ mA} \tag{2}$$

As shown in Equation 2, the output current ($I_{out2}$) is significantly lower by using the bypass capacitor 98 to initially charge the display panel 32. As a result, smaller capacitor and resistor values may be used in the circuit 110 as compared to the circuit 80 to maintain a certain output current and settling time.

Moreover, since the display panel 32 is initially charged via the bypass capacitor 98 when the bypass capacitor 98 is not connected to the op-amp 94, the output current to the display panel 32 is limited by the size of the capacitor 98 and the time in which the capacitor 98 is coupled to the display panel 32. Furthermore, since the resistor 96 is not coupled to the display panel 32 at any time, the output current ($I_{out}$) from the op-amp 94 is limited to charge the bypass capacitor 98. As such, the likelihood of a relatively high output current ($I_{out}$) conducting across the resistor 96 due to the large voltage difference between the display voltage (e.g., −2.5V) and the touch voltage (e.g., 2.5V) output via the op-amp 94 is eliminated because the resistor 96 will not be electrically coupled to the display panel 32, as per the operation of the circuit 110. As a result, the size of the resistor 96 may also be minimized.

Figure 8:
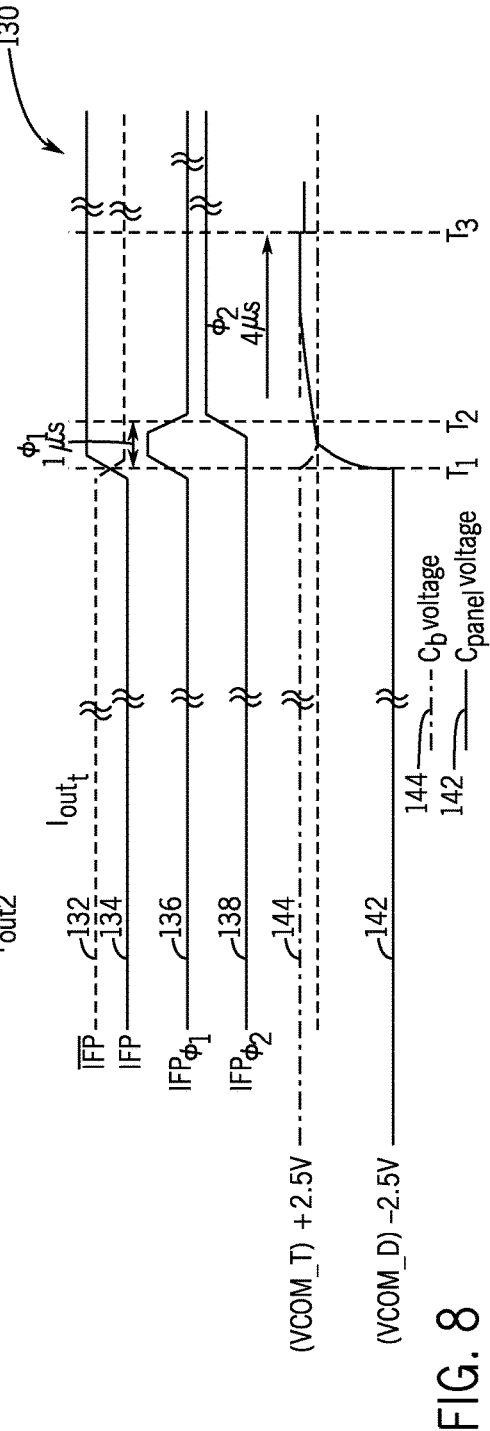
FIG. 8 illustrates timing and voltage chart for switches and capacitor voltages of the example circuit diagram of FIG. 7.

With the foregoing in mind, FIG. 8 illustrates a timing and voltage chart 130 that indicates how the switches of the circuit 110 may operate and how the voltages of the bypass capacitor 98 and the display panel 32 may react. Referring now to FIG. 8, $\overline{\text{IFP}}$ (interframe pause) signal 132 may correspond to a signal used to control the operation of the switch 84 and the switch 112. That is, when the $\overline{\text{IFP}}$ signal is high, the switches 84 and 112 may be closed, and when the $\overline{\text{IFP}}$ signal is low, the switches 84 and 112 may be open. The $\overline{\text{IFP}}$ signal 132 may mirror the IFP signal 134, which may correspond to a synchronization signal that may be used to indicate when the display panel 32 may be switching between display periods and touch periods. IFP signal 136 may correspond to a signal used to control the operation of the switch 100 and IFP signal 138 may correspond to a signal used to control the operation of the switch 116.

As shown in FIG. 8, before time T1, the $\overline{\text{IFP}}$ signal 132 may be high and the switches 84 and 112 may be closed. As such, the display panel 32 may be charged to the display voltage (VCOM_D) (voltage signal 142) via the display voltage source 82. In the same manner, the bypass capacitor 98 may be charging to the touch voltage (VCOM_T) (voltage signal 144) via the op-amp 94.

At time T1, the $\overline{\text{IFP}}$ signal 132 may go low, thereby causing the switches 84 and 112 to open. As such, the display voltage source 82 and the resistor 96 may be effectively removed from the circuit 110. Also at time T1, the IFP signal 136 may go high causing the switch 100 to close. Here, the display panel 32 may begin discharging the display voltage (VCOM_D) and charging to the touch voltage (VCOM_T) using the charge of the bypass capacitor 98. As such, at time T1, the voltage signal 142 of the display panel 32 may increase rapidly due to the charged bypass capacitor 98 being coupled to the display panel 32. At the same time, the voltage signal 144 of the bypass capacitor 98 may decrease rapidly as it is being discharged to charge the display panel 32.

In one embodiment, the IFP signal 136 may remain high for a certain amount of time (e.g., 1 µs) to enable the display panel to charge to within a range of the touch voltage (VCOM_T), as described above. Alternatively, care may be taken to ensure that the IFP signal 136 may remains high until the bypass capacitor 98 has fully discharged or just before it has fully discharged to ensure that the voltage of the display panel 32 continues to move toward the touch voltage (VCOM_T).

At time T2, the IFP signal 136 may return to low while the IFP signal 138 moves from low to high. As a result, the switch 100 may open at the same time that the switch 116 closes. When the switch 100 opens, the bypass capacitor 98 is disconnected from the display panel 32. At the same time, when the switch 116 closes, the output of the op-amp 94 and the resistor 114 is coupled to the display panel 32. As a result, the voltage signal 142 of the display panel 32 continues to increase until it reaches the touch voltage (VCOM_T). In one embodiment, the switch 116 may be closed for a certain amount of time (e.g., 4 µs) until the voltage at the display panel 32 settles at the touch voltage (VCOM_T) at time T3. As such, the settling time ($t_{settle}$) may correspond to the time between time T1 and time T3.

The timing signals described in FIG. 8 may continuously repeat to enable the electronic device 10 to simultaneously display image data and detect touch inputs. As electronic devices operate using higher refresh rates and shorter times between display periods and touch periods, it may be useful to limit the settling time ($t_{settle}$) such that the display panel 32 may display image data more clearly and detect touch inputs more accurately.

Figure 9:
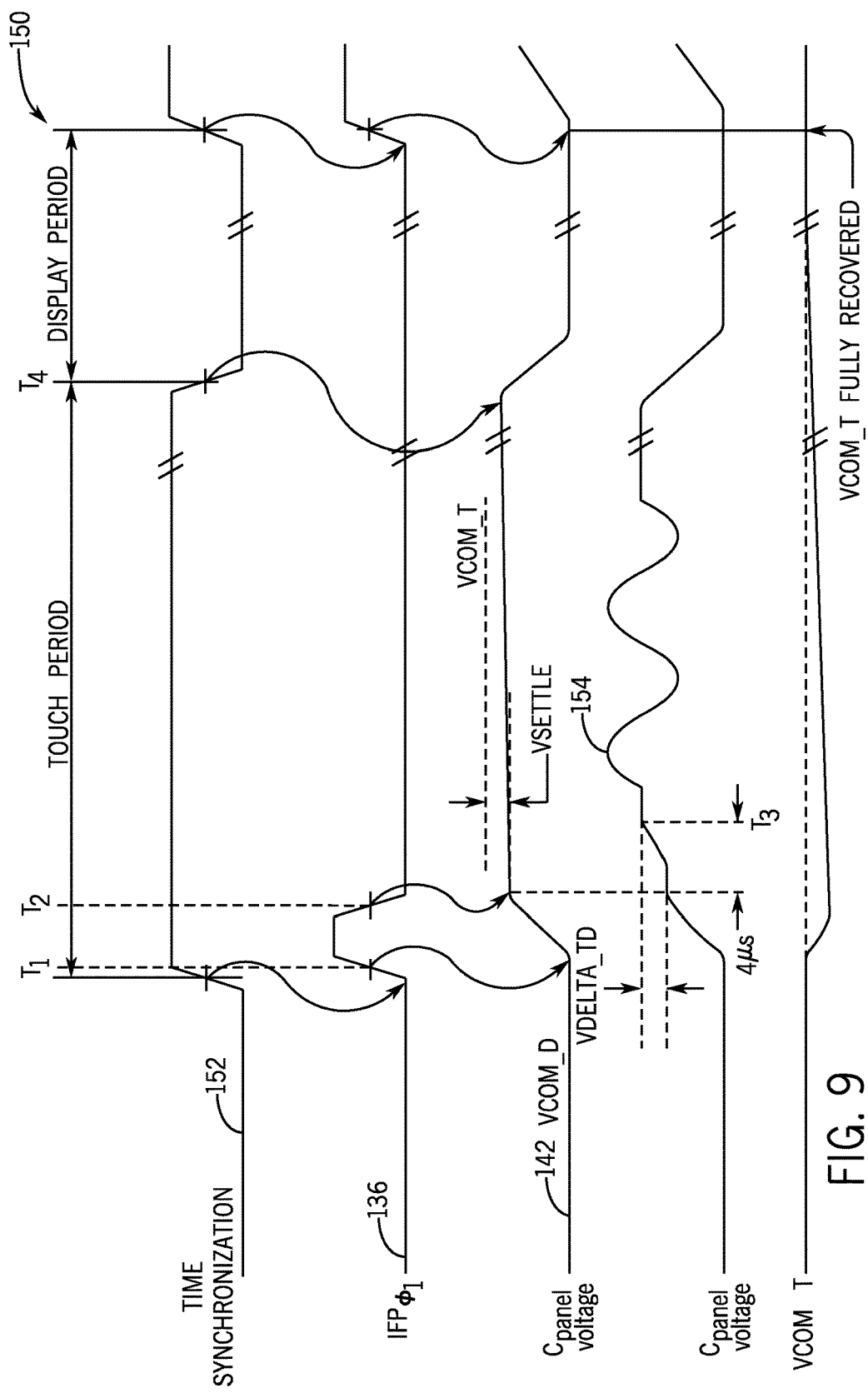
FIG. 9 illustrates another timing and voltage chart for switches and capacitor voltages of the example circuit diagram of FIG. 7.

With the foregoing in mind, FIG. 9 illustrates a timing and voltage chart 150 that indicates how the switches of the circuit 110 may operate and how the voltages of the bypass capacitor 98 and the display panel 32 may react. For example, time synchronization signal 152 may be a periodic signal that specifies when the display panel 32 may be in a display period and a touch period. The touch period may begin when the signal 136 becomes high at T1, as described above with regard to FIG. 8. As such, the voltage signal 142 of the display panel 32 may increase from the display voltage (VCOM_D) to the touch voltage (VCOM_T) via the bypass capacitor 98 at T1.

At time T2, the bypass capacitor 98 may be disconnected from the display panel 32 and the touch voltage source 92 may be connected to the display panel 32. As such, the voltage signal 142 may continue to increase to the touch voltage (VCOM_T) and remain at the touch voltage (VCOM_T) until the touch period is completed at time T4.

In one embodiment, after the voltage signal 142 has settled at time T3, the display panel 32 may begin to receive a voltage signal 154 as a sine wave, which may be used to detect the touch inputs. It should be noted that the voltage signal 154 is not depicted at the same scale as the voltage signal 142 associated with the display panel 32. Instead, voltage signal 154 is provided in FIG. 9 to illustrate how the display panel 32 may begin to receive a sine voltage signal for detecting touch inputs after the display panel 32 has been pre-charged using the circuit 110 described above or using the method described below with reference to FIG. 10.

Figure 10:
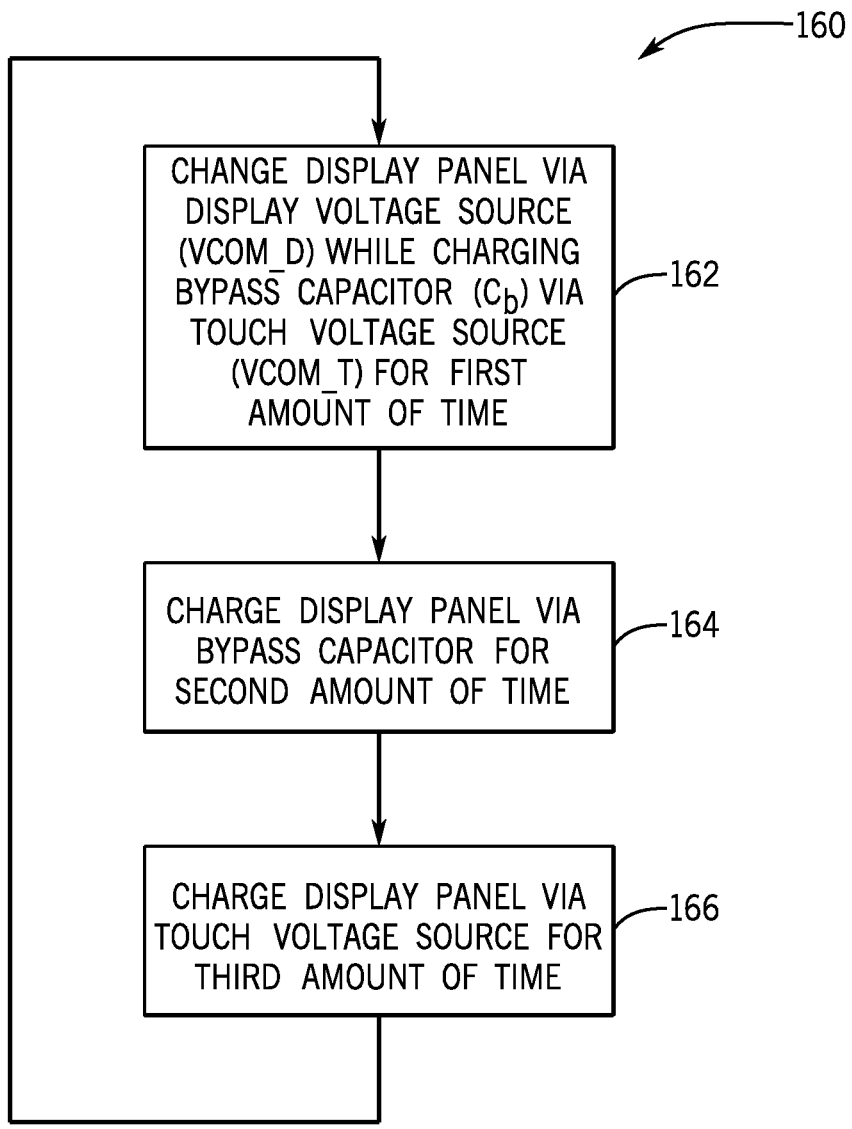
FIG. 10 illustrates a flow chart of a method for alternating between a display period and a touch period in a display panel of FIG. 1.

With the foregoing in mind, FIG. 10 illustrates a flow chart of a method 160 that may be employed by the display driver IC 30 for alternating between a display period and a touch period for the display panel 32. In certain embodiments, the display driver IC 30 may perform the method 160 using components of the circuit 110 described above or other equivalent component or circuit arrangements.

Referring now to FIG. 10, at block 162, the display driver IC 30 may charge the display panel 32 using the display voltage source 82 while simultaneously charging the bypass capacitor 98 using the touch voltage source 92 for a first amount of time. The first amount of time may correspond to a display period in which the display panel 32 may display image data.

After the first amount of time expires, at block 164, the display driver IC 30 may stop charging the display panel 32 and the bypass capacitor 98 and begin charging the display panel 32 using the stored energy of the bypass capacitor 98. Here, the display driver IC 30 may charge the display panel 32 using the bypass capacitor 98 for a second amount of time, such that the display panel 32 may charge to within a range of a desired voltage value. In certain embodiments, the size of the bypass capacitor 98 may be determined based on how quickly the stored energy of the bypass capacitor 98 may charge the display panel 32 to within the range of the desired voltage value. In addition, the size of the bypass capacitor 98 may be determined based on a current limit or desired current amount that the display panel 32 may be designed to receive.

After charging the display panel 32 via the bypass capacitor 98 for the second amount of time, the display driver IC 30 may stop charging the display panel 32 via the bypass capacitor 98 and begin charging the display panel 32 via the touch voltage source 92 for a third amount of time. During this third amount of time, the voltage of the display panel 32 may reach the desired voltage value. However, since the bypass capacitor 98 previously charged the display panel 30 to within a range of the desired voltage value, the output current ($I_{out2}$) provided via the op-amp 94 may be significantly lower as compared to if the bypass capacitor 98 was not used to previously charge the display panel 30.

After the display panel 32 is charged via the touch voltage source 92 for a third amount of time, the display driver 30 may repeat the method 160. By continuously repeating the method 160, the electronic device 10 that includes the display 26 may be capable of displaying image data using a faster refresh rate. Moreover, by providing synchronization signals to the display panel 32 more frequently, the display driver IC 30 may better detect touch inputs that may be received via the display panel 32.

Figure 11:
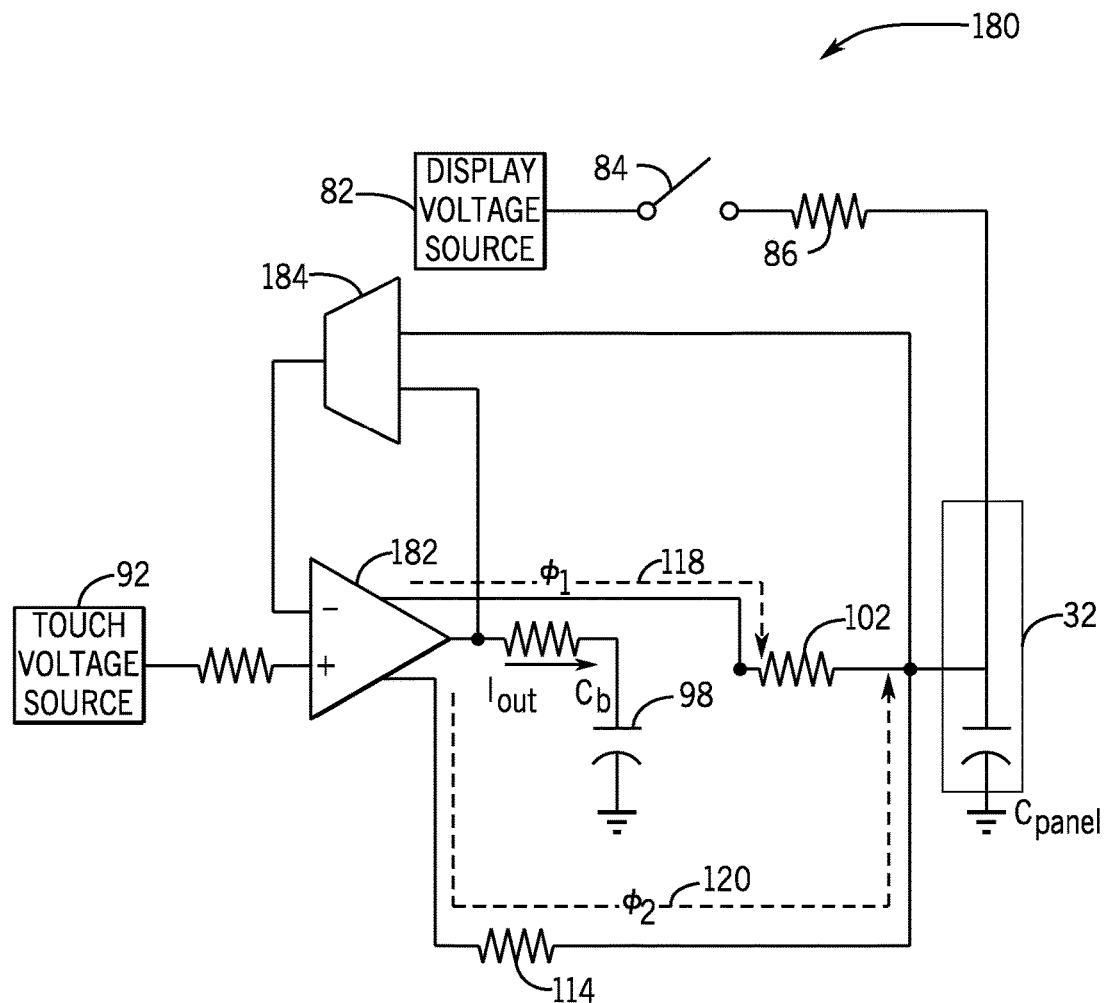
FIG. 11 is an example circuit diagram of a display driver integrated circuit (IC) that may pre-charge the display panel in the display of FIG. 5 more efficiently than the example circuit of FIG. 7, in accordance with an embodiment.

In certain embodiments, it may be desirable to pre-charge the bypass capacitor 98 and the display panel 32 more quickly, as compared to the manner in which the circuit 110 may pre-charge the bypass capacitor 98 and the display panel 32. With this in mind, FIG. 11 illustrates a circuit 180 that may pre-charge the bypass capacitor 98 and the display panel 32 more quickly than the circuit 110 using a fast mode of operation.

Generally, the circuit 180 operates under the same principles of the embodiments described above. That is, the bypass capacitor 98 may be charged while the display panel 32 is charged to the display voltage (VCOM_D) via the display voltage source 82 and the switch 84, and the display panel 32 may initially be charged to the touch voltage (VCOM_T) via the bypass capacitor 98 and then via the touch voltage source 92. However, in lieu of some of the circuit components included in the circuit 110, the circuit 180 may include operational amplifier 182 (op-amp 182), which may control how the display panel 32 is charged via the charging path 118 or the charging path 120. Components of the op-amp 182 will be described in more detail with reference to FIG. 12.

In addition to the op-amp 182, the circuit 180 may include a comparator component 184. The comparator component 184 may receive inputs that correspond to a voltage of the display panel 32 and a voltage of the bypass capacitor 98. In one embodiment, the comparator component 184 may determine a difference between the voltage of the display panel 32 and the bypass capacitor 98 after the display voltage source 82 is disconnected from the display panel 32. If the difference between the two voltages is greater than some threshold, the op-amp 182 may use internal circuit components (e.g., switches) to charge the bypass capacitor 98 or the display panel 32 using a fast mode of operation.

Figure 12:
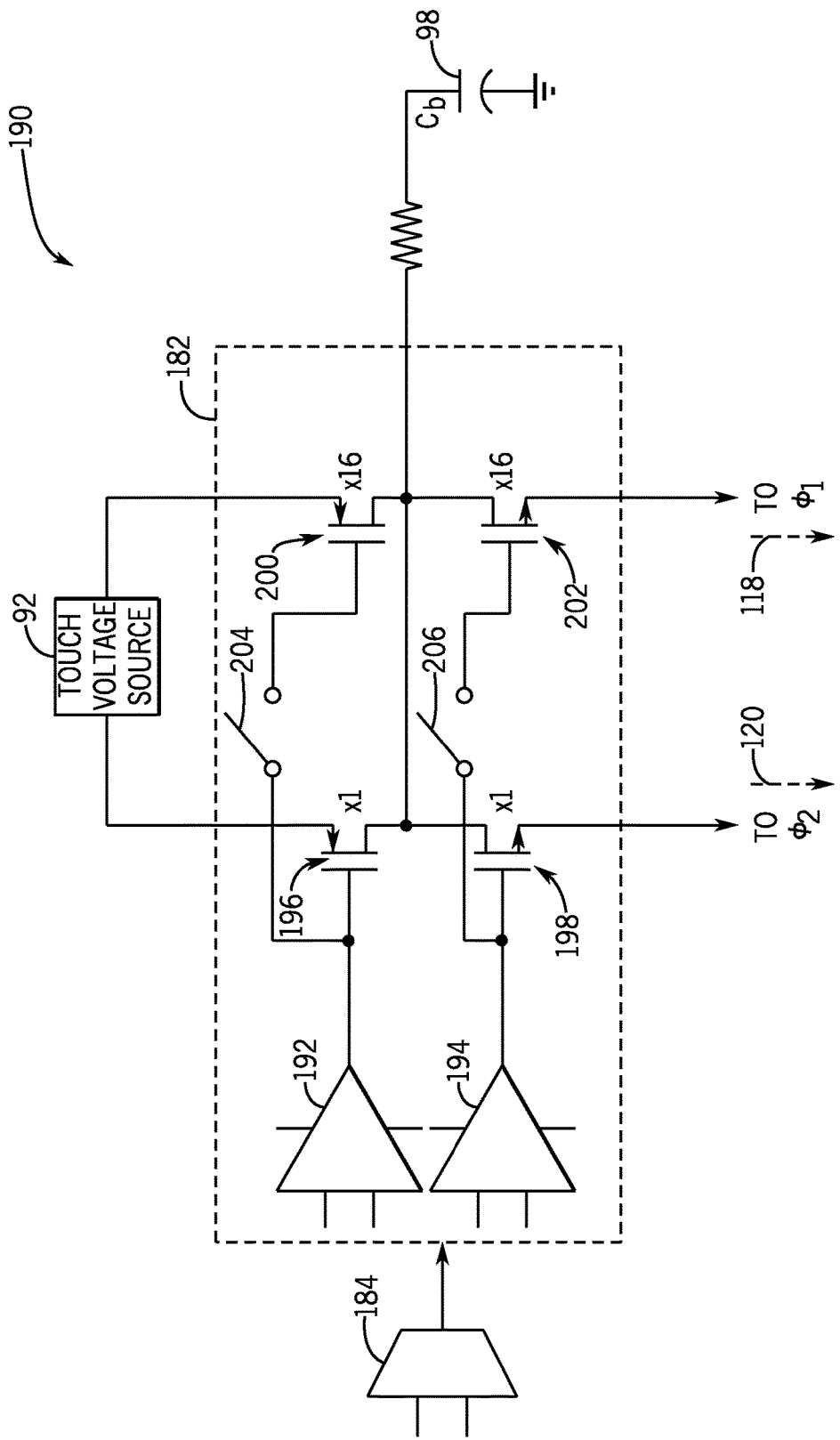
FIG. 12 is an example circuit diagram of components within an operational amplifier in the example circuit of FIG. 11, in accordance with an embodiment.

With the foregoing in mind, FIG. 12 illustrates a circuit diagram 192 of components within the op-amp 182 of the circuit 180. As shown in FIG. 12, the op-amp 182 may include additional op-amps 192 and 194, MOSFETs 196, 198, 200, and 202. The op-amps 192 and 194 may provide gate voltages to the gates of the MOSFETs 196, 198, 200, and 202. In one embodiment, the op-amps 192 and 194 may control the operation of the MOSFETs 196, 198, 200, and 202 based on the output of the comparator component 184. For example, when the difference between the voltage of the bypass capacitor 98 and the voltage of the display panel 32 is below the threshold, and the display panel 32 is in display mode, the op-amps 192 and 194 may provide a gate voltage to the MOSFET 196 while not providing a gate voltage to the MOSFET 198, respectively, thereby charging the bypass capacitor 98 via the touch source voltage 92 and the MOSFET 196.

With this in mind, when the difference between the voltage of the bypass capacitor 98 and the voltage of the display panel 32 is below the threshold, and the display panel 32 is in display mode, the op-amps 192 and 194 may provide a gate voltage to the MOSFET 196 while not providing a gate voltage to the MOSFET 198, respectively, and closing a switch 204, thereby providing a gate voltage to the MOSFET 200. The MOSFET 200 may include a number (e.g., 16) of switches in parallel coupled between the touch source voltage 92 and the bypass capacitor 98. As such, the MOSFET 200 may charge the bypass capacitor 98 a number (e.g., 16) of times faster per unit of time, as compared to a single MOSFET.

In the same manner, when the difference is above the threshold and the display panel 32 is operating in a touch mode, the op-amps 192 and 194 may provide not provide a gate voltage to the MOSFET 196 and provide a gate voltage to the MOSFET 198, respectively, and open the switch 204 and close a switch 206, thereby providing a gate voltage to the MOSFET 202. As a result, the bypass capacitor 98 may be coupled to the display panel 32 via the charging path 118. The MOSFET 202 may be similar to the MOSFET 200 in that the MOSFET 202 may include a number (e.g., 16) of switches in parallel coupled between the bypass capacitor 98 and the display panel 32. As such, the MOSFET 202 may charge the display panel 32 a number (e.g., 16) of times faster per unit of time, as compared to a single MOSFET.

After the bypass capacitor 98 has been discharged or after a certain amount of time passes, the switch 206 may open and the op-amps 192 and 194 may provide gate voltages to the MOSFETs 196 and 198, thereby charging the display panel 32 via the charging path 120. In one embodiment, the switch 206 may open after the display panel 32 has been charged to within a certain range (e.g., 50 mV) of a desired voltage level.

By using the circuit 180 and the circuit components of the circuit 190 described above, the bypass capacitor 98 and the display panel 32 may be charged more quickly to ensure that the display panel 32 is pre-charged quickly. As a result, faster refresh rates for displaying image data and detecting touch inputs may be capable by the display panel 32. It should be noted that although the circuit 190 has been described as including MOSFETs, switches, and op-amps, other circuit components may be used in place of these components to perform similar operations.

Figure 13:
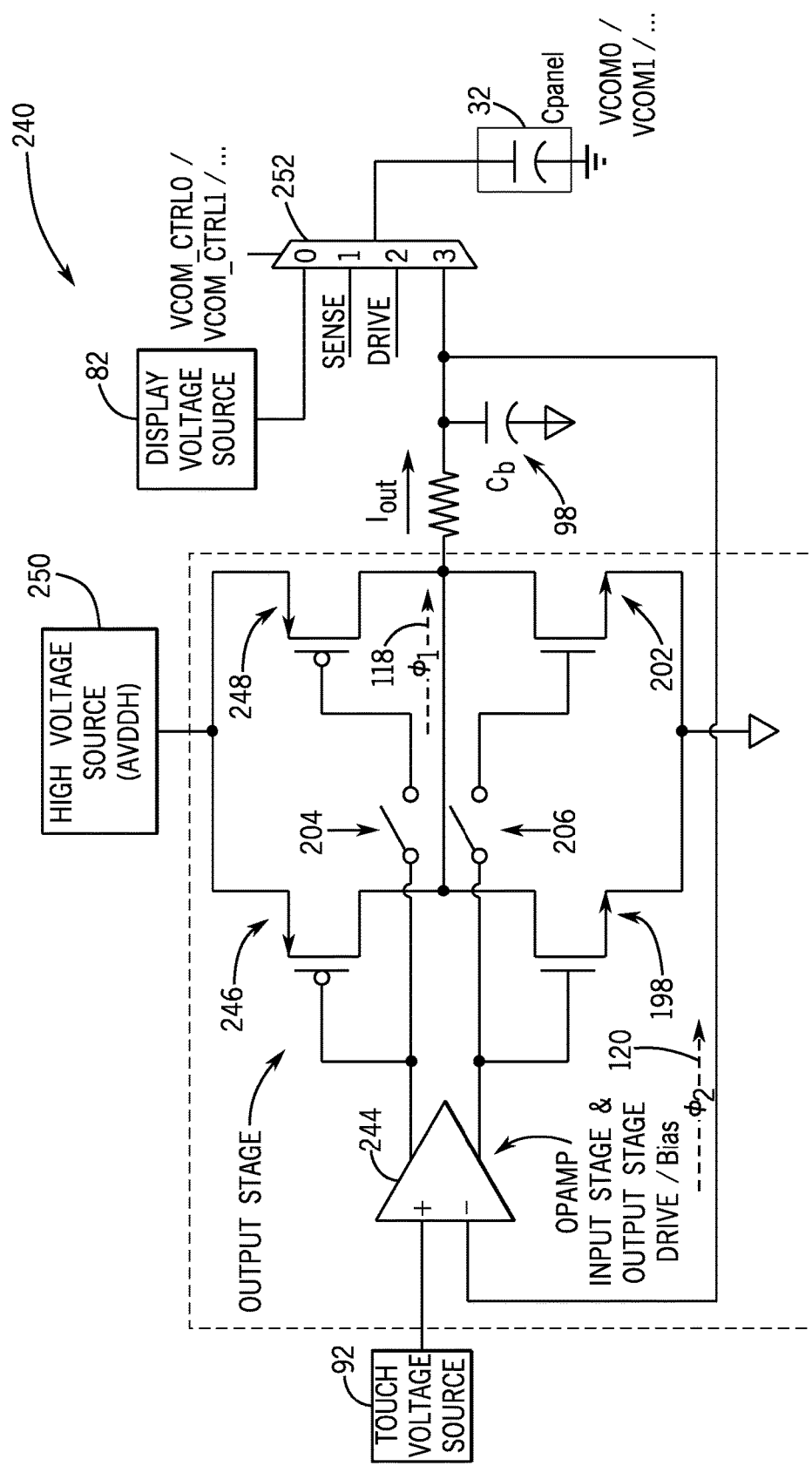
FIG. 13 is an example circuit diagram of a display driver integrated circuit (IC) that may pre-charge the display panel in the display of FIG. 5 with an improved noise level as compared to the example circuit of FIG. 12, in accordance with an embodiment.

In another embodiment, a circuit may pre-charge the display panel 32 using a fast mode similar to that described above with reference to FIG. 12, while providing low noise and low power consumption characteristics during the touch period relative to the circuit 180 described above. With this in mind, FIG. 13 illustrates a circuit diagram 240 of components of a buffer circuit 242. As shown in FIG. 13, the buffer circuit 242 may include an op-amp 244 in addition to the MOSFETs 198 and 202 and the switches 204 and 206, as described above. The buffer circuit 242 may also include MOSFETs 246 and 248, which may include inverted inputs at their respective gates.

The circuit 240 may also include a high voltage source 250 that outputs a high voltage value (AVDDH). The high voltage source 250 may be coupled to the source sides of the MOSFETs 246 and 248. The voltage value (AVDDH) provided by the high voltage source 250 may be a positive voltage supply greater than the voltage (VCOM_T) provided by the touch voltage source 92. The source sides of the MOSFETs 198 and 202 may be coupled to ground and the charging path 120 may be coupled to an inverted input of the op-amp 244.

Additionally, the circuit 240 may also include a 4-to-1 multiplexer (MUX) 252. The MUX 252 may receive inputs from the display voltage source 82 and from an output of the buffer circuit 242. The MUX 252 may also receive sense and drive inputs as part of the four input of the MUX 252. The sense and drive inputs may be signals supplied by a touch subsystem that enables the display panel 32 to detect the touch inputs.

Figure 14:
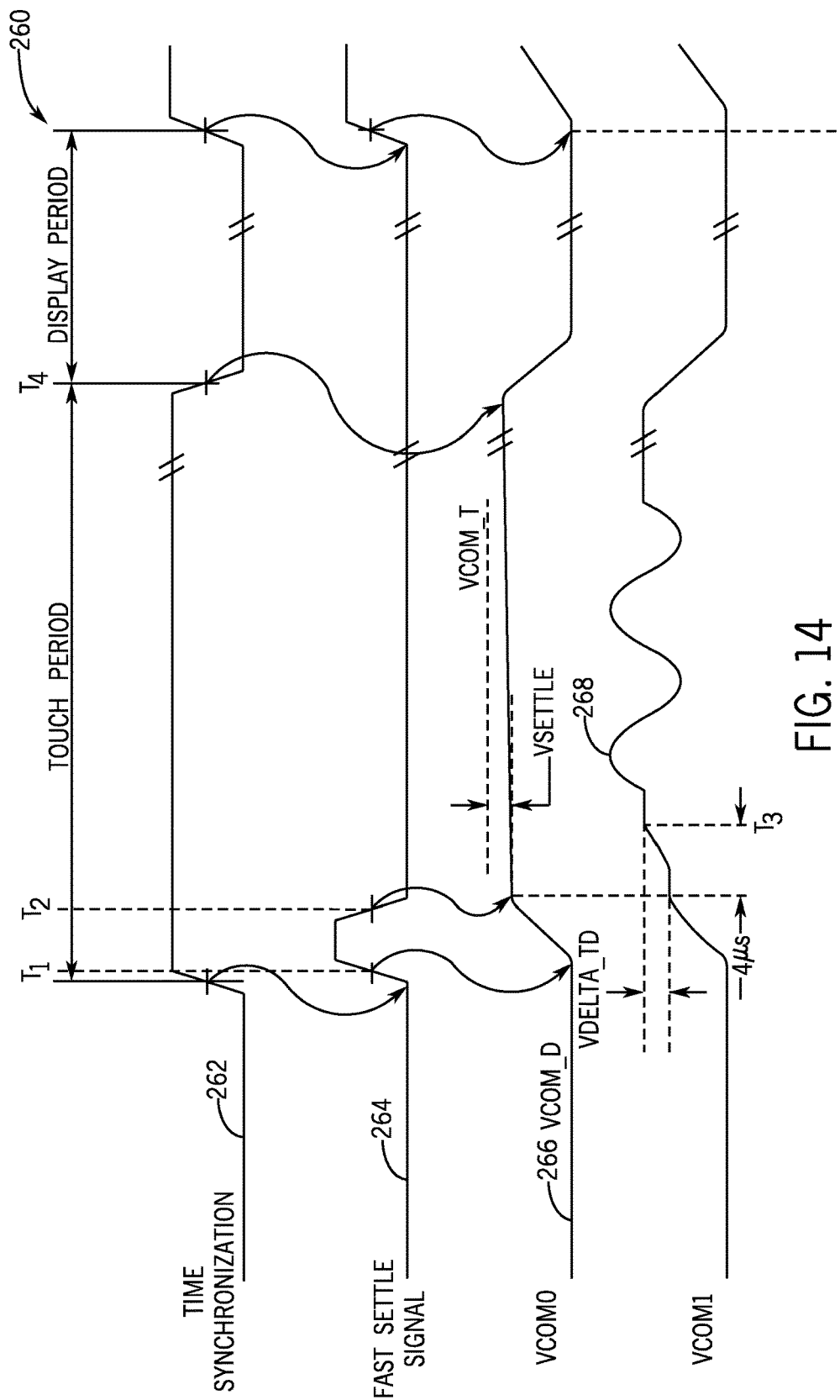
FIG. 14 illustrates a timing and voltage chart for the switches and MUX related to the operation of the circuit 240 of FIG. 13.

The MUX 252 may also receive a control input (VCOM_CTRL). The control input may cause the MUX 252 to switch between providing the output of the buffer circuit 242 and the sense and drive signals after the display panel 32 has been pre-charged to the touch voltage (VCOM_T). FIG. 14 illustrates a timing and voltage chart for the switches and MUX related to the operation of the circuit 240 of FIG. 13.

Referring now to the timing and voltage chart 260 of FIG. 14, a time synchronization signal 262 may indicate when the display panel 32 is operating in a touch period and a display period. A fast settle signal 264 may be used to operate the switches 204 and 206 of the buffer circuit 242. As such, when the fast settle signal 264 is high, the coupled to the high voltage source 250 or ground depending on the gate signals provided to the MOSFET 248 and 202.

A first voltage signal (VCOM0) 266 and a second voltage signal 268 (VCOM1) may correspond to voltage signals provided to the display panel 32 via the MUX 252 during the pre-charge phase and after the pre-charge phase, respectively. In one embodiment, the control signal provided to the MUX 252 may control which of the first voltage signal 266 and the second voltage signal 268 is provided to the display panel 32. By charging the display panel 32 using the circuit 240 of FIG. 13, the display panel 32 may charge more quickly relative to the circuit 110 while providing lower noise and power consumption characteristics during the touch period of the display panel 32.

With the foregoing in mind, by charging the display panel 32 more quickly, the time available to the display panel 32 for detecting touch inputs becomes greater, which effectively enables longer touch integration and thus lower touch signal-to-noise ratios and lower noise during the touch phase when maintaining a signal-to-noise ratio above a certain threshold. Referring to the timing and voltage chart 260, upon rising edge of signals 262 and 1264, the display panel 32 is connected to the output of the bypass capacitor 98, while the switches 204 and 206 are closed. As such, MOSFETs 246 and 248, and similarly MOSFETS 198 and 202, are connected in parallel, thereby lowering an effective output impedance of the buffer circuit 242 by enabling fast charging of the display panel 32 at the expense of higher noise as the bandwidth of the buffer circuit 242 is increased while the power consumption of the buffer circuit 242 also increases.

The falling edge of the fast settle signal 264 concludes the pre-charge phase causing MOFET 248 and the switch 206 to be disconnected from the output stage of the buffer circuit 242 in preparation of entering the touch period. At this time, the impedance at the output of the buffer circuit 242 is increased, thereby causing a decrease of the bandwidth of the buffer circuit 242. As a result, the output noise of the buffer circuit 242 may decrease while also reducing an amount of current consumption by the buffer circuit 242.

During the pre-charge phase, the MUX 252 may output the voltage signal 266 based on the control signal. That is, the MUX 252 may output the voltage (VCOM_T) provided by the bypass capacitor 98 to the display panel 32. After, the pre-charge period or after the display panel 32 has charged to the touch voltage (VCOM_T), the control signal may specify to the MUX 252 to provide the voltage signal 268 at time T3. As such, the voltage signal 268 may correspond to a touch drive signal that enables the display panel 32 to receive touch inputs.

Referring again to FIG. 14, parameter VDELTA_TD between times T2 and T3 specifies a voltage difference between the touch voltage (VCOM_T) and a touch common mode voltage. Nominally, those two voltages may be the same or substantially similar but may differ due to tolerances in the display 32. In any case, with respect to the voltage signal 268, a touch controller of the display 32 may take over a common electrode of the display panel 32 by connecting a drive signal (e.g., voltage signal 268) to the respective VCOM electrode of the display panel 32 after the pre-charge phase or when the display panel 32 settles from the touch voltage (VCOM_T) to the touch common mode voltage. At the same time, the voltage signal 266 may keep the touch voltage (VCOM_T) connected to the VCOM electrode of the display panel 32 via the charging path 120 throughout the touch period.

It should be noted that the buffer circuit 242 is used to pre-charge the display panel 32 from a display voltage (VCOM_D) to a touch voltage (VCOM_T). Discharging the display panel 32 from the touch voltage (VCOM_T) to the display voltage (VCOM_D) may be handled by a similar but separate buffer circuit having a similar configuration but different voltage levels. That is, a negative supply may be used in place of the high voltage source 250, such that the negative supply may be below the display voltage (VCOM_D) level (e.g., −2.5V). This buffer circuit would thus connect the display voltage (VCOM_D) to the 4:1 MUX mentioned above after the touch phase is complete upon falling edge of the signal 262 at time T4

In certain embodiments, a plurality of MUXs 252 may be present in the display 32 such that there may be one MUX 252 per touch sensor. As a result, the display panel 32 may receive less noise signals during the touch phase, such that noise from touch sensors connected to the touch voltage source 92 may not be misinterpreted as touch inputs. By employing the circuits described above, the display panel 32 effectively enables longer touch integration and thus lower touch signal-to-noise ratios and lower noise during the touch phase when maintaining a signal-to-noise ratio above a certain threshold Although the above disclosure has been described with regard to enabling the display panel 32 to switch from the display period to the touch period, it should be noted that the systems and methods described herein may also be used in the same manner to assist the display panel 32 to pre-charge to the display voltage (VCOM_D) at the end of the touch period. In this case, the circuit components of FIGS. 7, 11, 12, and 13 may operate in a mirror arrangement. That is, the display voltage source 82 and the touch voltage source 92 may be switched with each other, such that the bypass capacitor 98 may be used to initially charge the display panel 32 to the display voltage (VCOM_D). As such, the display panel 32 may efficiently switch between display mode and touch mode to display image data and receive touch inputs more effectively.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display driver circuit, comprising:
   a first switch configured to couple a first voltage source in series with a display panel, wherein the display panel is configured to receive a first voltage via the first voltage source, and wherein the display panel is configured to display image data and receive one or more touch inputs;
   a second switch configured to couple a second voltage source in series with a capacitor;
   a third switch configured to couple the capacitor in series with the display panel, wherein the capacitor is configured to provide a second voltage to the display panel; and
   a fourth switch configured to couple the second voltage source in series with the display panel, wherein the second voltage source is configured to provide the second voltage to the display panel, and wherein the capacitor is configured to enable the display panel to settle to the second voltage more quickly as compared to if the display panel were charged via the second voltage source without using the capacitor.

2. The display driver circuit of claim 1, wherein the first voltage source is configured to enable the display panel to display the image data, and wherein the second voltage source is configured to enable the display panel to receive the one or more touch inputs.

3. The display driver circuit of claim 1, wherein the first switch and the second switch are configured to open and close at the same time.

4. The display driver circuit of claim 1, comprising a processor configured to:
   close the first switch and the second switch for a first amount of time thereby charging the display panel via the first voltage source and charging the capacitor via the second voltage source;
   close the third switch for a second amount of time thereby charging the display panel via the capacitor; and
   close the fourth switch for a third amount of time thereby charging the display panel via the second voltage source.

5. The display driver circuit of claim 4, wherein the processor is configured to open the first switch and the second switch when the third switch is closed.

6. The display driver circuit of claim 4, wherein the processor is configured to open the third switch when the fourth switch is closed.

7. The display driver circuit of claim 1, comprising an operational amplifier configured to output a touch voltage based on an input voltage provided via the second voltage source.

8. The display driver circuit of claim 7, comprising a resistor directly coupled between the second switch and the operational amplifier.

9. The display driver circuit of claim 4, wherein the display panel is configured to charge from a first voltage value after the first amount of time to a second voltage value after the third amount of time.

10. The display driver of claim 9, wherein a voltage of the display panel is configured to settle to the second voltage time during the second amount of time and the third amount of time.

11. The display driver of claim 10, wherein the second amount of time and the third amount of time is approximately 5 μs.

12. A system comprising:
   a display panel configured to display image data and receive one or more touch inputs;
   a capacitor configured to provide a first voltage to the display panel;
   a first switch configured to couple the capacitor in series with the display panel;
   a second switch configured to couple a voltage source in series with the display panel; and
   a processor configured to:
      charge the display panel via the capacitor and the first switch for a first amount of time, wherein the first amount of time is less than approximately 1 μs; and
      charge the display panel via the voltage source and the second switch for a second amount of time.

13. The system of claim 12, wherein the display panel is configured to receive one or more touch inputs during the first amount of time and the second amount of time.

14. The system of claim 12, comprising a third switch configured to couple the capacitor in series with the voltage source.

15. The system of claim 14, wherein the processor is configured to:
close the third switch when the first switch is open thereby charging the capacitor via the voltage source; and
simultaneously open the third switch and close the first switch thereby charging the display panel via the capacitor.

16. The system of claim 15, wherein the processor is configured to simultaneously open the first switch and close the second switch thereby charging the display panel via the voltage source.

17. An electronic device, comprising:
a display panel configured to display image data and receive one or more touch inputs;
a first voltage source configured to output a first voltage associated with displaying the image data via the display panel;
a second voltage source configured to output a second voltage associated with receiving one or more touch inputs via the display panel;
a capacitor configured to provide a third voltage to the display panel;
a plurality of switches configured to couple the first voltage source, the second voltage source, the capacitor, or any combination thereof to the display panel; and
a processor configured to:
cause the display panel to charge via the first voltage source and a first switch of the plurality of switches;
cause the display panel to charge via the capacitor and a second switch of the plurality of switches after the display panel is charged via the first switch; and
cause the display panel to charge via the second voltage source and a third switch of the plurality of switches after the display panel is charged via the second switch, wherein the capacitor is configured to enable the display panel to settle to the third voltage more quickly as compared to if the display panel were charged via the second voltage source and the third switch.

18. The electronic device of claim 17, wherein the processor is configured to disconnect the first voltage source from the display panel via the first switch when the display panel is charging via the capacitor and the second switch.

19. The electronic device of claim 17, wherein the processor is configured to disconnect the capacitor from the display panel via the second switch when the display panel is charging via the second voltage source and the third switch.

20. A method, comprising:
simultaneously charging a display panel comprising a plurality of pixels configured to display image data, wherein the display panel is configured to receive one or more touch inputs via a first voltage source and a capacitor configured to provide a first voltage to at least one of the plurality of pixels in the display panel via a second voltage source, wherein the first voltage is associated with receiving the one or more touch inputs, and wherein the display panel and the capacitor are simultaneously charged for a first amount of time;
charging the display panel via the capacitor after the first amount of time for a second amount of time; and
charging the display panel via the second voltage source after the second amount of time for a third amount of time.

21. The method of claim 20, comprising:
determining whether a difference between a second voltage of the display panel and a third voltage of the capacitor is greater than a threshold; and
charging the capacitor via a plurality of switches when the difference is greater than the threshold.

22. The method of claim 20, comprising:
determining whether a difference between a second voltage of the display panel and a third voltage of the capacitor is greater than a threshold; and
charging the display panel via the capacitor and a plurality of switches when the difference is greater than the threshold.

23. A system comprising:
a display panel comprising a plurality of pixels configured to display image data, wherein the display panel is configured to receive one or more touch inputs;
a capacitor configured to provide a first voltage to at least one of the plurality of pixels in the display panel, wherein the capacitor is coupled in series with a first voltage source;
a first plurality of switches configured to couple the capacitor in series with the first voltage source;
a second plurality of switches configured to couple the capacitor in series with the display panel;
a first switch configured to couple the first voltage source in series with the capacitor;
a second switch configured to couple the capacitor in series with the display panel; and
an operational amplifier configured to:
receive a difference between a first voltage of the display panel and a second voltage of the capacitor;
charge the capacitor via the first switch when the difference is below the threshold;
charge the capacitor via the first plurality of switches when the difference is above the threshold;
charge the display panel via the capacitor and the second plurality of switches when the threshold is above the threshold after the capacitor is charged for a first amount of time; and
charge the display panel via the first voltage source and the second switch for a second amount of time after the first amount of time.

24. The system of claim 23, wherein the first plurality of switches and the second plurality of switches comprise a plurality of metal-oxide-semiconductor field-effect transistors (MOSFETs).

25. The system of claim 23, wherein the operational amplifier comprises the first plurality of switches, the second plurality of switches, the first switch, and the second switch.

26. The system of claim 23, wherein the first plurality of switches and the second plurality of switches each comprises at least sixteen switches.

27. The system of claim 23, comprising a comparator circuit configured to determine the difference between the first voltage and the second voltage.

28. A system comprising:
a display panel configured to display image data and receive one or more touch inputs;
a capacitor configured to provide a first voltage to the display panel, wherein the capacitor is coupled in series with a first voltage source configured to output a first voltage;

a first switch configured to couple the capacitor in series with the first voltage source;
a second switch configured to couple the capacitor in series with ground;
a multiplexer configured to couple the capacitor in series with the display panel, wherein the multiplexer is a 4:1 multiplexer; and
an operational amplifier configured to:
  receive a second voltage from a second voltage source, wherein the first voltage is greater than the second voltage;
  charge the capacitor via the first switch and the first voltage source;
  charge the display panel via the capacitor and the multiplexer after the capacitor is charged for a first amount of time; and
  charge the display panel via the second voltage source for a second amount of time after the first amount of time.

29. The system of claim 28, wherein an output of the capacitor is coupled in series with an inverted input of the operational amplifier.

30. The system of claim 28, wherein a third voltage source configured to output a third voltage that corresponds to a display period of the display panel is coupled in series with the multiplexer.

31. The system of claim 28, wherein the capacitor is configured to enable the display panel to settle to the second voltage more quickly as compared to when the display panel is charged via the second voltage source without using the capacitor.

32. The system of claim 28, comprising a buffer circuit, wherein buffer circuit comprises the capacitor, the multiplexer, the operational amplifier, the first switch, and the second switch, and wherein an impedance of the buffer circuit is configured to decrease a noise output to the display panel.

* * * * *

UNITED STATES PATENT AND TRADEMARK OFFICE
CERTIFICATE OF CORRECTION

PATENT NO. : 10,175,830 B2
APPLICATION NO. : 14/870815
DATED : January 8, 2019
INVENTOR(S) : Taif A. Syed et al.

Page 1 of 1

It is certified that error appears in the above-identified patent and that said Letters Patent is hereby corrected as shown below:

In the Claims

Claim 10, Column 16, Line 47, please replace "time" with --value--.

Claim 13, Column 17, Line 2, please insert --the-- between "receive" and "one".

Claim 17, Column 17, Line 25, please insert --the-- between "receiving" and "one".

Claim 23, Column 28, Line 41, replace "threshold" with --difference--.

Claim 32, Column 20, Line 14, insert --the-- between "wherein" and "buffer".

Signed and Sealed this
Fourteenth Day of January, 2020

Andrei Iancu
*Director of the United States Patent and Trademark Office*